Nov. 21, 1944.                J. HEITMANN                    2,363,129
                                AIRPLANE
                        Filed Dec. 3, 1943          3 Sheets-Sheet 1

INVENTOR.
JOHN HEITMANN
BY
F. Ledermann
ATTORNEY

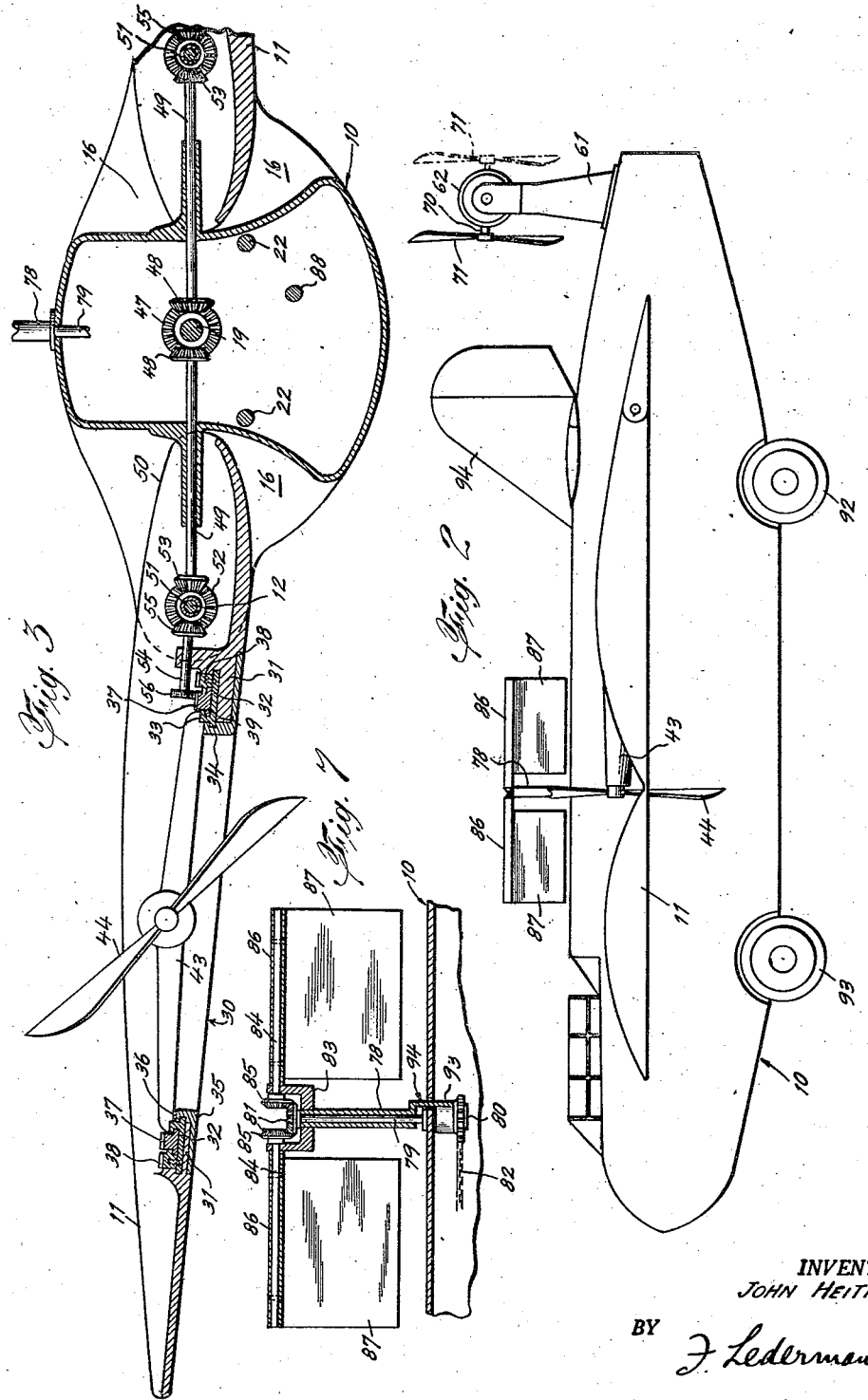

Nov. 21, 1944.  J. HEITMANN  2,363,129
AIRPLANE
Filed Dec. 3, 1943  3 Sheets-Sheet 3
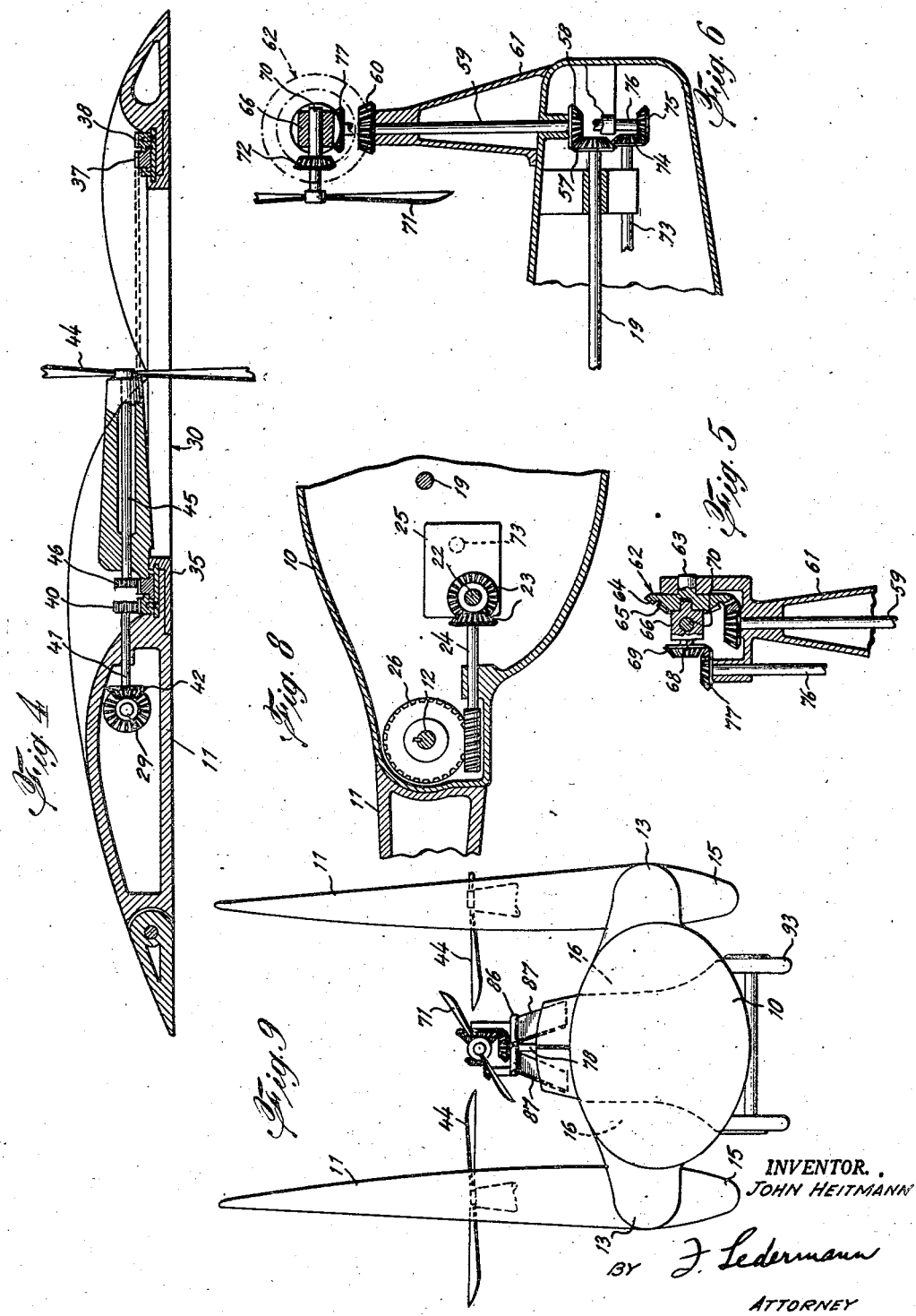
INVENTOR.
JOHN HEITMANN
BY J. Ledermann
ATTORNEY Patented Nov. 21, 1944

2,363,129

UNITED STATES PATENT OFFICE 2,363,129

AIRPLANE

John Heitmann, Brooklyn, N. Y.

Application December 3, 1943, Serial No. 512,700

6 Claims. (Cl. 244—7)

This invention relates to airplanes, and aims to provide new and useful improvements whereby the plane may be made to fly forward in the usual manner, but in addition thereto to rise straight into the air, to remain stationary in the air or to move forward or backward at very slow speeds so that the plane may be said to maneuver slowly in the air, and to descend slowly in a vertical direction.

The plane is furthermore provided with means for being propelled on the ground in the same manner as an automobile, and also with dirigible means so that it may change its direction of flight while maneuvering very slowly or more rapidly.

The above as well as other objects will become apparent in the following description, wherein characters of reference refer to like-numbered parts in the accompanying drawings. It is to be understood that the drawings are intended to serve the purpose of illustration only, and it is neither intended nor desired to limit the invention necessarily to the specific details shown excepting insofar as they may be deemed essential to the invention.

Referring briefly to the drawings,

Fig. 2 is a side elevational view of the same.

Fig. 3 is a cross-sectional view taken on the line 3—3 of Fig. 1.

Fig. 4 is a cross-sectional view taken on the line 4—4 of Fig. 1.

Fig. 5 is a cross-sectional view taken on the line 5—5 of Fig. 1.

Fig. 6 is a cross-sectional view taken on the line 6—6 of Fig. 1.

Fig. 7 is a cross-sectional view taken on the line 7—7 of Fig. 1.

Fig. 8 is a cross-sectional view taken on the line 8—8 of Fig. 1.

Fig. 9 is a front elevational view of the plane, showing the wings swung into vertical position.

Figure 1:
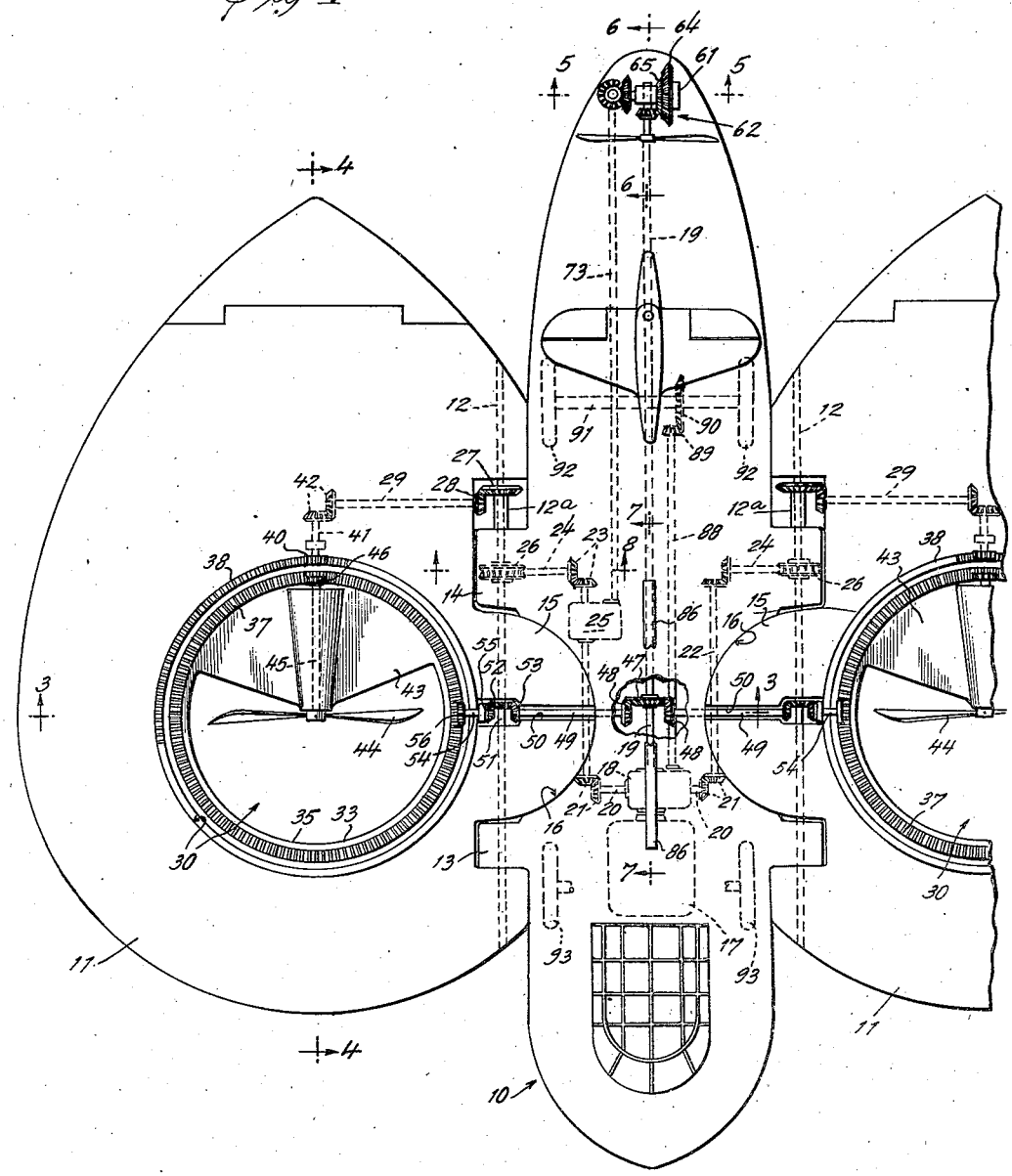
Fig. 1 is a fragmentary plan view of the plane.

Referring in detail to the drawings, the numeral 10 indicates the fuselage or body of the plane, and the numerals 11 the wings thereof. The wings 11 are pivotally secured to the body 10 on shafts or spindles 12 supported in lateral, spaced projections 13 and 14 extending from the sides of the body. The wing portion 15 intermediate the projections 13 and 14 is semi-circular in outline, and the body 10 is provided with complementary cut-outs 16 to provide space for the movement of these wing extensions during swinging of the wings from the horizontal to the vertical.

A single motor is shown at 17, connected with a gear box 18 from which a main shaft 19 extends rearward. Stubs shafts 20 extend laterally from the gear box 18, meshing through bevel gears 21 with shafts 22, which pass into and through a gear boxes 25. Through bevel gears 23 the shaft 22 drives a worm 24 in mesh with a worm gear 26 keyed to the wing spindle 12, the latter being rigid in the wing 11 but rotatably mounted in the body extensions 13 and 14; thus, actuation of the shafts 20 will cause the wings 11 to be swung about their pivots.

Loosely mounted on each shaft 12 and rigidly supported on a tubular bracket or sleeve 12a surrounding the shaft 12 and secured to the body projection 14, is a bevel gear 27 in mesh with a bevel gear 28 rigid on a shaft 29. A circular cut-out 30 is formed through each wing 11 and is provided with an annular ledge 31 rigid with the wing. Resting slidably thereon is a flat ring 32 having that edge facing the center formed into an upward and outward extending flange 33, and having further an internally extending peripheral lip 34. A clamping ring 35, secured from the bottom to the ledge 31 in any suitable manner, not shown, has its upper jaw or flange embracing the annular projection 33, and thereby maintains the ring 32 on the ledge 31.

A pair of annular racks 37 and 38 are arranged concentrically one within the other on the ring 32, the outer rack 38 being secured to the ring 32, as by screws, and the inner rack 37 being freely slidable on the ring 32 and having an annular lip 39 registering under the flange 33. Rack teeth are provided on the rack 38 through only about a quadrant thereof, and in mesh therewith is a pinion 40 on a shaft 41 supported in the wing. Through bevel gears 42, the shaft 29 drives the pinion 40 and hence turns the rack 38.

A web-like frame 43 is rigid with and is supported by a portion of the flange 33 of the ring 32, and extends in to the center of the circular wing opening 30. At the center of this opening a propeller 44 is mounted on a shaft 45 provided with a pinion 46 on the end thereof. The pinion 46 is in mesh with the rack 37, and it is apparent that rotation of the rack 37 will cause rotation of the propeller 44.

The motor shaft 19 has a transmission bevel gear 47 thereon, in mesh with bevel gears 48 rigid on shafts 49. The wing extensions 15 are provided with vertical slots therethrough extending from the shafts 49 upward through the surfaces thereof. For each wing, a sleeve 51 is rotatably mounted on the spindle 12, and a bevel gear 52 is rigid with this gear; a bevel gear 53 on the shaft 49 is in mesh with the gear 52. A bevel gear 55, rigid on a stub shaft 54, is in mesh with gear 52, and a pinion 56 on the shaft 54 is in mesh with the rack 37. Thus rotation of the motor shaft 19 causes rotation of the propellers 44.

The operation of the mechanism so far described may now be set forth. The propellers 44 are actuated, as just mentioned, by rotation of the main shaft 19, through the media of the shafts 49, 51, and 54, whereby the racks 37 are rotated by the pinions 56, thus causing the racks to rotate the propeller pinions 46. For normal straight-ahead flight, the wings are in the horizontal position, or, rather, the fully spread position, shown in Fig. 1. To rise vertically from the ground, the wings 11 are swung upward about their pivots 12 by engagement of the shafts 20 in the gear box 18 by means of a suitable clutch or the like, not shown, operated by the pilot. Thus, through the media of shafts 22 and 24 the spindle 12 is turned, and with it turns the rigid bevel gear 27. The shaft 29 is thus rotated, and in turn rotates shaft 41 and pinion 40, the latter turning the rack 38 and hence the propeller support 43 and the propeller. The maximum arc through which the wings can be swung is, as seen in Fig. 9, 90 degrees; hence rack teeth are needed over a similar arc on the rack 38, and when the wings have assumed the maximum vertical position the propellers will also have been swung through a 90 degree arc into their positions shown in Fig. 9. Thereby the propellers will tend to lift the plane straight into the air. It is to be noted that the propellers may be running during the entire time that the wings are being swung about their pivots, and thus the direction of pull or lift of the propellers may lie in any angle between the straight ahead and the straight up positions, and that the wings may be stopped in any such intermediate position with the propellers running.

The main shaft 19 extends all the way rearward of the body, and a bevel gear 57 thereon meshes with a similar gear 58 on a vertical shaft 59 extending upward and having a bevel gear 60 on its upper end. A double bevel gear 62 has its stub shaft 63 supported in the frame 61 and is provided with the spaced bevel gear teeth 64 and 65. A block or housing 66 has a rigid stub shaft 67 rotatably anchored in an axial recess in the face of the gear 62, and has a second coaxial shaft or rod 68 extending rigidly from the opposed side thereof, on which a bevel gear 69 is rigid. A stub shaft 70 is rotatably mounted in the block 66, on the free end of which a propeller 71 is fixed, and is provided with a rigid bevel gear 72 in mesh with the smaller bevel gear 65 of the double bevel gear 62.

The normal position for straight-ahead motion of the plane is that shown in Figs. 1, 2, and 6, with the propeller 71 exerting a straight-ahead pull and actuated simultaneously with the propellers 44 by the main shaft 19. An auxiliary shaft 73 extends rearward from the gear box 25, and a clutch, not shown, may be associated with this gear box so that the shaft 73 may be rotated simultaneously with the shaft 22 when desired. A bevel gear 74 on the end of the shaft 73 meshes with a bevel gear 75 on a vertical shaft 76 having the bevel gear 77 on its upper end in mesh with the bevel gear 69. It is apparent that rotation of the shaft 73 will thus cause rotation of the shaft 67 and block 66, thereby carrying with it the propeller shaft 70. Thus, the propeller 71 can be swung from the forward position shown through an arc of 180 degrees into the reverse position shown in broken lines in Fig. 2 as a maximum, and it may of course also be stopped when it reaches the horizontal position, not shown. Thus the propeller 71 may be utilized together with the propellers 44 to lift the plane straight into the air, or independently, when facing rearward, as a brake to retard the forward motion of the plane.

A vertical sleeve or housing 78 has its lower end 93 enlarged, and a peripheral portion above the lower end, i. e., an arcuate neck, 94, extends rotatably through an arcuate slot in the roof of the body 10; a shaft 79 within the sleeve 78 is rigidly supported on the roof. This shaft has a bevel gear 81 on its upper end, and the sleeve extension 93 has a sprocket gear 80 on its lower end, about which is trained a chain 82. Coaxially and pivotally mounted in the two opposed arms of a horizontally extending bracket 83 rigid with the tube 78, are a pair of horizontal staffs 84 having bevel gears 85 in mesh with the bevel gear 81. Tubes 86 are rigid on the staffs 84, and depending rigidly from the tubes 86 are vanes 87. It is apparent that actuation of the chain 82 will cause simultaneous swinging of the vanes 87 on their pivots in opposite directions and rotation of the sleeve 79 with consequent swinging of the vanes in a horizontal arc. The normal position of the vanes 87 is that shown in Figs. 1 and 2, and in Fig. 9 they are shown in a position displaced from the normal. The chain 82 may be connected to any suitable control wheel or lever, not shown, accessible to the pilot. Control of these vanes will enable small and rapid lateral to and fro changes in direction of the plane, as may be required in traffic.

A set of rear wheels 92 is provided under the body 10. A drive shaft 88 for these wheels extends from the gear box 18 through the medium of a clutch, not shown, and a bevel gear 89 on the end thereof meshes with a bevel gear 90 on the axle 91 of the wheels 92. The usual set of front wheels is shown at 93. Thus, the plane may be propelled on the ground in the fashion of an automobile, especially with the wings in raised position, whenever necessary or desirable. The usual rudder is shown at 94.

A plane constructed along the lines of this specification may be utilized for fast travel in the usual manner, and also for straight, or nearly straight, ascent and descent, as is obvious. On the ground it can weave through traffic and pass through narrow spaces. I can also achieve other desirable objects in the art of flying, which need not be set forth in detail.

Obviously, modifications in form and structure may be made without departing from the spirit or scope of the invention.

I claim:

1. An airplane comprising a body and wings, said wings being pivoted to said body on axes parallel with the axis of the body, said wings having openings therethrough, propeller shafts rotatably mounted in said openings and having propellers thereon, means for swinging said wings about said pivot axes, and means for rotating said shafts.

2. An airplane comprising a body and wings, said wings being pivoted to said body on axes parallel with the axis of the body, said wings having openings therethrough, pivotal supports mounted in the wings in the peripheries of said openings, the axes of said supports lying substantially at right angles to the wing surfaces, propeller shafts rotatably mounted in said supports and projecting into said openings and having propellers thereon, means for swinging said wings about their said pivot axes, means for rotating said shafts, and means for turning said supports about their said pivot axes.

3. An airplane comprising a body and wings, said wings being pivoted to said body on axes parallel with the axis of the body, said wings having openings therethrough, supports pivotally mounted in the wings in the peripheries of said openings, shafts rotatably mounted in said supports and projecting into said openings and having propellers on the ends thereof, means for swinging said wings about their said axes, means associated with said first means for simultaneously turning said supports about their pivots, and means for rotating said shafts.

4. An airplane comprising a body and wings, said wings being pivoted to said body on axes parallel with the axis of the body, said wings having openings therethrough, supports pivotally mounted in the wings in the peripheries of said openings, shafts rotatably mounted in said supports and projecting toward the centers of said openings and having propellers on the ends thereof, means for rotating said shafts, and means for simultaneously swinging said wings about their said axes and for turning said supports about their pivots.

5. An airplane comprising a body and wings, said wings being pivoted to said body on axes parallel with the axis of the body and having circular openings therethrough, a rack rotatably mounted in each of said wings in the periphery of said opening and having a shaft rotatably mounted therein projecting toward the center of said openings, a propeller on the end of said shaft, means for rotating said shaft, means for swinging said wings about their said axes, a pinion in mesh with said rack, and means associated with said pinion and said first means for turning said rack simultaneously with said swinging of said wings.

6. An airplane comprising a body and wings, said wings being pivoted to said body on axes parallel with the axis of the body and having circular openings therethrough, a circular rack rotatably mounted in each of said wings in the periphery of said opening, a shaft rotatably mounted in said rack and projecting toward the center of said opening and having a propeller on the end thereof, said rack having an internal annular flange thereon, a second circular rack slidably and rotatably mounted on said flange, a pinion on said shaft in mesh with said second rack, means for rotating said pinion to rotate said propeller shaft, a pinion in mesh with said first rack, means for swinging said wings on their said axes, and means associated with said last-named means and with said last-named pinion for turning said first rack simultaneously with said swinging of said wings.

JOHN HEITMANN.